(12) United States Patent
Amthor et al.

(10) Patent No.: US 11,985,415 B2
(45) Date of Patent: May 14, 2024

(54) MICROSCOPY SYSTEM AND METHOD FOR GENERATING AN OVERVIEW IMAGE

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/467,578

(22) Filed: Sep. 7, 2021

(65) Prior Publication Data

US 2022/0078340 A1 Mar. 10, 2022

(30) Foreign Application Priority Data

Sep. 9, 2020 (DE) ...................... 10 2020 123 505.4

(51) Int. Cl.
| | | |
|---|---|---|
| *G06N 20/00* | (2019.01) | |
| *G06F 18/214* | (2023.01) | |
| *G06F 18/24* | (2023.01) | |
| *G06T 5/50* | (2006.01) | |
| *G06T 7/11* | (2017.01) | |
| *G06V 30/262* | (2022.01) | |
| *H04N 23/60* | (2023.01) | |

(52) U.S. Cl.
CPC .......... *H04N 23/64* (2023.01); *G06F 18/214* (2023.01); *G06F 18/24* (2023.01); *G06N 20/00* (2019.01); *G06T 5/50* (2013.01); *G06T 7/11* (2017.01); *G06V 30/274* (2022.01); *G06T 2207/10056* (2013.01); *G06T 2207/20221* (2013.01)

(58) Field of Classification Search
None
See application file for complete search history.

(56) References Cited

U.S. PATENT DOCUMENTS

| | | |
|---|---|---|
| 9,274,328 B2 | 3/2016 | Kaminaga |
| 2010/0150473 A1 | 6/2010 | Kwon et al. |
| 2014/0185906 A1* | 7/2014 | Ding ..................... G01N 33/49 |
| | | 382/134 |
| 2014/0313312 A1 | 10/2014 | Gaiduk et al. |
| 2017/0330336 A1 | 11/2017 | Roblek et al. |

(Continued)

FOREIGN PATENT DOCUMENTS

| | | |
|---|---|---|
| CN | 104299213 A | 1/2015 |
| DE | 102013006994 A1 | 10/2014 |

(Continued)

OTHER PUBLICATIONS

Wickborn, DE Application No. 102020123504.6, Search Report, dated Jun. 8, 2021, 6 pages (English translation not available).

(Continued)

*Primary Examiner* — Samuel D Fereja
(74) *Attorney, Agent, or Firm* — LaBatt, LLC

(57) ABSTRACT

A microscopy system comprises a microscope and a computing device which is configured to control the microscope to capture a plurality of raw overview images showing the sample environment with different capture parameters. The computing device comprises a machine learning model trained with training raw overview images, which receives the raw overview images as input and generates therefrom an output which is or which defines the overview image.

16 Claims, 8 Drawing Sheets

(56) References Cited

U.S. PATENT DOCUMENTS

| | | | |
|---|---|---|---|
| 2018/0189610 A1* | 7/2018 | Kandemir | G06V 10/774 |
| 2019/0347776 A1 | 11/2019 | Chou et al. | |
| 2020/0057291 A1 | 2/2020 | Haase et al. | |
| 2020/0088984 A1 | 3/2020 | Haase et al. | |
| 2020/0371333 A1 | 11/2020 | Amthor et al. | |
| 2020/0371335 A1 | 11/2020 | Amthor et al. | |
| 2021/0125317 A1 | 4/2021 | Asayama | |
| 2021/0133966 A1* | 5/2021 | Fuchs | G06N 3/0454 |
| 2021/0160434 A1 | 5/2021 | Amthor et al. | |
| 2022/0043251 A1* | 2/2022 | Moore | G02B 21/06 |
| 2022/0345606 A1 | 10/2022 | Sato | |
| 2022/0385809 A1 | 12/2022 | Kai et al. | |

FOREIGN PATENT DOCUMENTS

| | | |
|---|---|---|
| DE | 102017109698 A1 | 11/2018 |
| DE | 102017111718 A1 | 12/2018 |
| DE | 102019114117 B3 | 8/2020 |
| DE | 102019113540 A1 | 11/2020 |
| DE | 102019114012 A1 | 11/2020 |
| DE | 102019131678 A1 | 5/2021 |

OTHER PUBLICATIONS

Dr. Hoffman, DE Application No. 102020123505.4, Search Report, dated Jan. 3, 2021, 6 pages (English translation not available).

Yin, Zhaozheng et al., "Cell-Sensitive Microscopy Imaging for Cell Image Segmentation," Stanford University, MICCAI 2014, Part I, LNCS 8673, pp. 41-48, 2014, 8 pages.

Yuma, Kinoshita et al., "Scene Segmentation-Based Luminance Adjustment for Multi-Exposure Image Fusion," Journal of Latex Class Files, vol. 14, No. 8, Aug. 2015, 16 pages.

Office action for U.S. Appl. No. 17/467,582, dated Jan. 9, 2023, 21 pages.

Notice of allowance for U.S. Appl. No. 17/467,582, dated May 3, 2023, 10 pages.

Notice of allowance for U.S. Appl. No. 17/467,582, dated Aug. 10, 2023, 10 pages.

* cited by examiner

MICROSCOPY SYSTEM AND METHOD FOR GENERATING AN OVERVIEW IMAGE

REFERENCE TO RELATED APPLICATIONS

The current application claims the benefit of German Patent Application No. 10 2020 123 505.4, filed on 9 Sep. 2020, which is hereby incorporated by reference.

FIELD OF THE DISCLOSURE

The present disclosure relates to a microscopy system and a method for generating an overview image.

BACKGROUND OF THE DISCLOSURE

Automation is playing an increasingly important role in modern microscopy systems. For example, a sample to be analyzed is to be identified, positioned and subjected to an initial analysis by a microscopy system in a largely automated manner. To this end, a user is provided with an overview/navigation map in which the user can select a location to which the motorized sample stage can then automatically move to analyze the location with a higher magnification. An automatic sample identification can also be used for the purposes of collision prevention by defining areas of allowed movement for motorized microscope components based on the identified sample or the identified sample carrier. An autofocusing or automatic coarse focusing is also desirable.

The use of an overview image is currently pivotal in the accomplishment of these tasks. A generic microscopy system thus comprises a microscope which is configured to capture a raw overview image of a sample environment. The raw overview image can be used as the overview image either directly or after undergoing image processing. An optimum image quality is important in order to be able to achieve the aforementioned objectives with an optimum reliability. Achieving an optimum image quality is complicated in particular by variable ambient and measurement conditions. Lighting conditions can vary considerably due to, among other things, ambient light from sources other than a light source of the microscopy system. The different types of sample carriers and samples that can be used, which differ considerably in terms of their visibility in a raw overview image, represent a further challenge.

Microscopy systems that capture and process a raw overview image have been described by the Applicant, for example, in DE 10 2017 109 698 A1, DE 10 2013 006 994 A1, DE 10 2019 113 540, DE 10 2019 114 117 and DE 10 2019 131 678.

SUMMARY OF THE DISCLOSURE

It can be considered an object of the invention to provide a microscopy system and a method which render possible the provision of an optimum-quality overview image of a sample environment in different ambient and measurement conditions.

This object is achieved by means of the microscopy system with the features of claim 1 and by means of the method with the features of claim 13.

According to the invention, the microscopy system of the type described in the foregoing comprises a computing device which is configured to control the microscope to capture a plurality of raw overview images showing the sample environment with different capture parameters. The computing device comprises a machine learning model trained with training raw overview images, which receives the raw overview images as input and generates therefrom an output which is or which defines the overview image.

In a method for generating an overview image according to the invention, a plurality of raw overview images of a sample environment are captured by an overview camera of a microscope with different capture parameters. The raw overview images are input into a machine learning model trained with training raw overview images. The machine learning model generates therefrom an output which is or which defines the overview image.

Suitable capture parameters can depend on numerous factors, for example, a sample type, a sample carrier and lighting/ambient conditions. Since these factors are often not known with sufficient precision in advance or can only be taken into account with precision with manual effort or using supplementary or more complex equipment, suitable capture parameters are frequently not known in advance. By capturing a plurality of raw overview images with different capture parameters, it is possible to acquire at least one suitable overview image in very different situations. An automated selection or processing of the raw overview images in order to output a high-quality overview image is rendered difficult by the variety of different types of raw overview images. In particular, suitable assessment criteria can vary depending on the application. The utilization of a machine learning model trained with training raw overview images in accordance with the invention, on the other hand, offers significant advantages: by means of the training raw overview images, it is possible to cover a wide spectrum of different types of raw overview images, which can differ in particular with regard to sample type, sample carrier or lighting/ambient conditions. Suitable decision criteria are determined in the learned model by means of the provided training raw overview images without it being necessary to specify explicit rules for the plurality of influential factors in an image processing program. The microscopy system and the method of the invention can thus assess or process the captured raw overview images for a wide spectrum of different scenarios in order to output a high-quality overview image.

Optional Embodiments

Advantageous variants of the microscopy system according to the invention and of the method according to the invention are the object of the dependent claims and are explained in the following description.

Input and Output of the Machine Learning Model

An output of the machine learning model can be the overview image itself or a specification by means of which the overview image is defined. This specification can in particular be a selection of the raw overview image to be used as the overview image from a plurality of raw overview images or a specification of how the overview image is to be calculated from a plurality of raw overview images by means of a predetermined algorithm or a predetermined table. For example, the output can be an assessment or score for each raw overview image, whereupon the raw overview image with the highest score is selected as the overview image. Alternatively, the raw overview images with the highest scores can be superposed into an overview image. Consequently, in variant embodiments, the machine learning model or the computing device in general is in particular designed to select one of the raw overview images as the overview image or to generate the overview image by combining at least two of the raw overview images or by selecting at least two of the raw overview images to be combined.

The raw overview images can be entered individually as input, for example, when a score is to be calculated for each of the raw overview images as the output. Alternatively, all raw overview images can collectively constitute the input. This allows the machine learning model to compare, for example, scores of the respective raw overview images or to apply such scores in a calculation and thus output the overview image directly. If a plurality or all of the raw overview images collectively constitute the input, the machine learning model can alternatively calculate and output the overview image directly without calculating scores. By processing the raw overview images in a neural network of the machine learning model, the output overview image does not have to be, for example, a simple linear combination of input raw overview images, but rather can also be formed from the input raw overview images in a more complex manner.

Capture Parameters for Raw Overview Images

A plurality of raw overview images are generated with different capture parameters, which can generally be understood to denote any of the different microscope settings or operating modes available. A capture parameter can in particular relate to:

Light polarization: For example, it is possible to use linearly polarized illumination light, wherein the polarization direction differs depending on the raw overview image. It is also possible to use light with an elliptical or circular polarization.

Light wavelengths of illumination light and/or detection light: In particular microscopic samples can comprise different elements (e.g. biological cells or cell organelles, electronic or semiconductor components) whose visibility is significantly wavelength-dependent.

Illumination settings, illumination intensity, illumination angle and dye excitations, in particular fluorescence or phosphorescence excitations.

Software settings: The raw overview images can be generated by an algorithm. For example, a plurality or all of the raw overview images can be generated using different sensitivities, wherein the sensitivities are generated solely by means of different parametrizations of their calculation while any hardware settings remain unaltered.

Capture modalities or contrast method: The raw overview images can differ in particular with regard to the illumination modality used; for example, images can be captured by means of widefield microscopy, Gaussian lightsheet microscopy, Bessel lightsheet microscopy, STED illumination microscopy or confocal microscopy.

Camera sensitivities, exposure times or different saturation levels can lead to different image brightnesses of the raw overview images.

Knowledge of the capture parameters can be used when determining how the overview image is selected or formed from the raw overview images. This process is described in more detail later on.

Assessment of Sample Areas

In principle, it is possible for a decision regarding which of the raw overview images is incorporated in the overview image to be based on the entire image content of each raw overview image. In practice, however, when an overview image is used in the microscopy system, a sample area within the overview image is more significant. Any judgements made by a user will be based on the depiction of the sample area. The sample area can be subjected to image processing and analysis steps, for example an autofocusing, so that the image quality in this part of the overview image is particularly pertinent. For an image background, on the other hand, for example an area outside the sample carrier or outside a cover slip area, a poorer image quality can also be acceptable. It may even be expedient to suppress image details for the image background, for example by means of a darker display and/or a display with a lower contrast compared to the sample area.

The machine learning model can be designed to identify sample areas in the raw overview images in particular for the aforementioned purposes. The machine learning model is optionally designed to select which of the raw overview images is used as the overview image or for the overview image via an assessment of the respective sample areas in the raw overview images. The assessment of the respective sample areas can relate in particular to an image quality of the relevant image area. For example, the raw overview image whose sample area has the best image quality can be selected as the overview image. The selection can in particular be based on the sample areas alone. A raw overview image that has a poor image quality outside the sample carrier, for example overdriven and thus low in contrast, can nevertheless still be selected as the overview image when its sample area has a higher image quality than the sample areas in the other raw overview images.

In order to locate a sample area, the machine learning model can be designed to perform a segmentation in one, a plurality or all of the raw overview images. A segmentation result indicates which image areas were identified as sample areas. For example, the segmentation result can be a segmentation/binary mask in which a certain pixel value indicates that that pixel belongs to a sample area and another pixel value indicates that the corresponding pixel does not belong to a sample area. It is not necessary to re-calculate a segmentation mask for each raw overview image, it also being possible to perform a single calculation of a segmentation mask which is subsequently used for all raw overview images alike. The segmentation can also be determined using an input image which is formed from a plurality or all of the raw overview images, for example by adding together/superposing the raw overview images. The segmentation in this case is a semantic segmentation in which a certain meaning (semantic label) is assigned to an area of a segmentation mask, the meaning in particular relating to whether or not the area in question is a sample area. A further graduated semantic segmentation can also differentiate between different sample types. For example, different sample elements, such as cell organelles, can be differentiated from other sample elements by means of a semantic segmentation and subsequently assessed or weighted differently.

The machine learning model can comprise a segmentation machine learning model, an instance segmentation machine learning model or a detection machine learning model. In the case of an instance segmentation machine learning model, different sample areas are differentiated from one another in the same image. This makes it possible to assess or weight the sample areas differently. With a detection machine learning model, it is possible to detect whether a certain sample type is included in the overview image, the location of which can then also be determined.

The computing device or machine learning model can determine the assessment of each sample area based on an assessment criterion relating to, e.g., an overdrive, an underdrive, image noise, a frequency distribution of brightness values and/or a contrast. If only the sample area is being assessed, it is accordingly irrelevant whether, for example, the often very bright cover slip edges are overdriven or image noise levels in a darker background are very high. Rather, the raw overview image whose sample area receives the best quality assessment can be identified.

The machine learning model can optionally utilize contextual data when determining the overview image from the raw overview images. The contextual data can also be taken into account when determining and/or assessing a sample area in the raw overview images and describe one or more of the following characteristics:

A sample type or sample carrier type in the raw overview images: For example, geometric information relating to different sample types or sample carrier types can be known in advance, which can be exploited for a segmentation or a detection of an object in the raw overview images. It can also be known in advance which illumination parameters or image capture parameters are suitable for different sample types so that a raw overview image can be selected as or for the overview image based on this knowledge. Which sample type or sample carrier type is displayed in the raw overview images can either be known in advance or determined first, for example by the classification (machine learning) model described in the following. Results of other measurements can also provide information regarding a sample type or sample carrier type displayed or potentially displayed in the raw overview images.

A type of an experiment to which the raw overview images belong: Contextual data can relate to the experiment in the context of which the raw overview images were captured. The experiment can begin in particular after the capture and assessment of the raw overview images. It may be possible, for example, to infer a sample type or sample carrier type from the type of the experiment.

Capture parameters: It is possible to indicate, for each raw overview image, the capture parameters with which the latter was captured, wherein in particular the aforementioned capture parameters are possible. Knowing the capture parameters means that information is available regarding, among other things, a depiction of different sample types in the raw overview images, which can be exploited for the location of sample areas. Filter settings or sample stage settings can also be taken into account as contextual data.

Identification of the Sample Type or Sample Carrier Type

Knowing the sample type and/or the sample carrier type can be helpful in the described assessment of sample areas or even independently of such an assessment. The machine learning model can be designed to identify a sample carrier type and/or a sample type of a sample supported by the sample carrier in one or more of the raw overview images. The machine learning model can comprise a trained classification model for this purpose. One or more raw overview images—or alternatively a combination of the raw overview images, an image segment from the raw overview images or an image processing result based on the raw overview images, e.g. a segmentation mask—are fed to the classification model. The output is a classification result, which differentiates at least, for example, between fluid samples and tissue sections or between a dyed and an undyed tissue section and/or electronic or semiconductor components. With respect to sample carrier types, it is possible to discriminate, e.g., at least between chamber slides, microtiter plates, slides with a cover slip or Petri dishes. A localization of the sample or of the sample carrier generally does not occur in this step.

The machine learning model or the computing device can be configured to select whether or how the different raw overview images are used as or for the overview image depending on the identified sample type or sample carrier type.

The computing device is optionally configured to access a predetermined assessment table which contains assessments depending on at least one capture parameter and the sample type or sample carrier type. When the computing device receives information regarding capture parameters of the raw overview images and when the sample type or sample carrier type is determined as described in the foregoing, a corresponding assessment can be read out from the assessment table for each of the raw overview images. Based on the assessments, a selection is made regarding which of the raw overview images is used as or for the overview image.

Training of the Machine Learning Model

A training of the machine learning model can occur as a supervised learning process. Each of the training raw overview images is thus labelled with an annotation indicating an assessment of the corresponding training raw overview image. The assessment can be specified manually and comprise, e.g., scores within a predetermined range, for example from 1 to 10. Through the training, a (given) learning algorithm can adjust model parameter values of the machine learning model using the training raw overview images. To this end, the learning algorithm comprises an optimization method and an objective function to be optimized, for example a reward function to be maximized or a loss function to be minimized. The loss function describes a deviation between an output of the machine learning model calculated for input training raw overview images with current model parameter values and the associated annotations. Depending on a current result of the loss function, the model parameter values are modified iteratively by means of the optimization method, e.g. by backpropagation and (stochastic) gradient descent.

If an unknown raw overview image is input into the ready-trained machine learning model, the latter calculates an output therefrom which ideally corresponds to the annotations of the training raw overview images, i.e. in particular an assessment with, e.g., a score between 1 and 10. The overview image is subsequently formed from the raw overview images based on the assessments. For example, the raw overview image with the highest score is selected. Alternatively, a plurality of raw overview images with the highest scores are combined, in which case the scores can also serve as weights.

Alternatively, the machine learning model can be learned via an unsupervised training. In this case, unannotated training raw overview images are used. It is possible, for example, to only use raw overview images that have been classified by a user as being of high quality as training raw overview images. The machine learning model learns to identify such images in this manner. If an unknown raw overview image is input into the trained machine learning model, the latter can output an assessment of whether and to what extent the unknown raw overview image resembles the high-quality training raw overview images.

It is also possible to implement a partially supervised training, in which only a part of the training raw overview images is annotated, or a reinforcement learning.

General Features

A microscopy system is understood to be an apparatus that comprises at least one computing device and a microscope. In principle, a microscope can be understood to be any measuring device with magnification capabilities, in particular a light microscope, an X-ray microscope, an electron microscope, a macroscope or an image-capturing device with magnification capabilities of some other design.

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphic processors. The computing device can also be configured to control the microscope camera, image capture, the sample stage drive and/or other microscope components.

A computer program according to the invention comprises commands that cause the execution of one of the described method variants when said method variants are executed by a computer. The computer program can in particular comprise commands by means of which it is possible to implement the processes described in relation to the computing device.

The machine learning model can be formed by, e.g., one or more neural networks and comprise in particular a CNN (convolutional neural network). In this case, model parameter values comprise entries of convolutional matrices. Model architectures of a deep neural network other than a CNN are also possible.

An overview camera for capturing a raw overview image can be provided in addition to a sample camera with which images of a sample area are captured with a higher magnification. Alternatively, one and the same camera can be used, wherein different objectives or optical systems are used for the capture of a raw overview image and a more magnified sample image. A raw overview image can be fed to the machine learning model immediately upon being captured by a camera or first calculated from one or more images before being fed to the machine learning model. A raw overview image covers an area which encompasses and surrounds a location at which a sample is generally positioned and which is designated as the sample environment in the present disclosure. The raw overview images can correspond with respect to their field of view and in particular be captured successively with the same camera. In the case of a corresponding field of view, each raw overview image covers the same area of the sample environment. Pixels that occupy the same position in different raw overview images (e.g. the pixels of an upper left corner of each raw overview image) can be superposed, as mentioned above, in order to form the corresponding pixels of the overview image. The raw overview images can also be captured with partly different or overlapping fields of view. A sample can be understood to be any object, fluid or structure in the present disclosure.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program. In further embodiments of the invention, the machine learning model can be replaced by a classic image processing algorithm. The latter can in particular be designed to calculate an assessment using the described assessment criteria such as image noise or contrast.

BRIEF DESCRIPTION OF THE FIGURES

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 1

Figure 1:
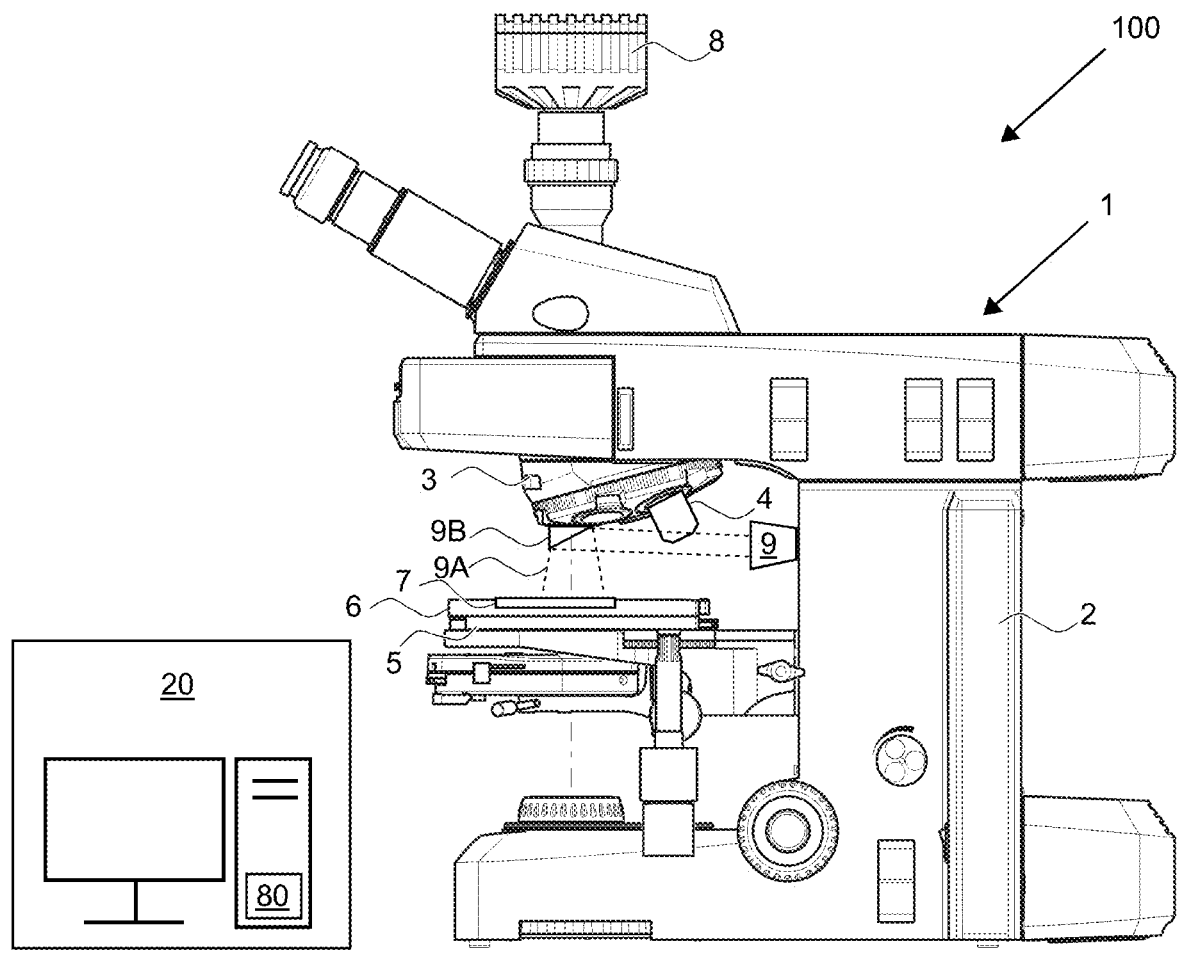
FIG. 1 is a schematic illustration of an example embodiment of a microscopy system of the invention.

FIG. 1 shows an example embodiment of a microscopy system 100 according to the invention. The microscopy system 100 comprises a computing device 20 and a microscope 1, which is a light microscope in the illustrated example, but which in principle can be any type of microscope. The microscope 1 comprises a stand 2 via which further microscope components are supported. The latter can in particular include: an objective changer/revolver 3, on which an objective 4 is mounted in the illustrated example; a sample stage 5 with a holding frame 6 for holding a sample carrier 7 and a microscope camera 8. If the objective 4 has been rotated so as to be located in the microscope light path, the microscope camera 8 receives detection light from one or more samples supported by the sample carrier 7 in order to capture a sample image.

The microscope 1 also comprises an overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged so as to view the sample carrier 7 directly without a mirror 9B. In principle, the microscope camera 8 can also constitute an overview camera when a different objective, in particular a macroobjective, is selected via the objective revolver 3 for the capture of an overview image.

The computing device 20 is intended to output a high-quality overview image based on a plurality of captured raw overview images. To this end, the computing device 20 is configured to control the microscope 1 in order to capture a plurality of raw overview images with different capture parameters. The raw overview images differ from one another by the different capture parameters, for example different exposure times, illumination light intensities, illumination wavelengths or filter settings.

The calculation of the overview image occurs by means of a computer program 80 executed by the computing device 20, as described in the following in greater detail with reference to the further figures.

FIG. 2

Figure 2:
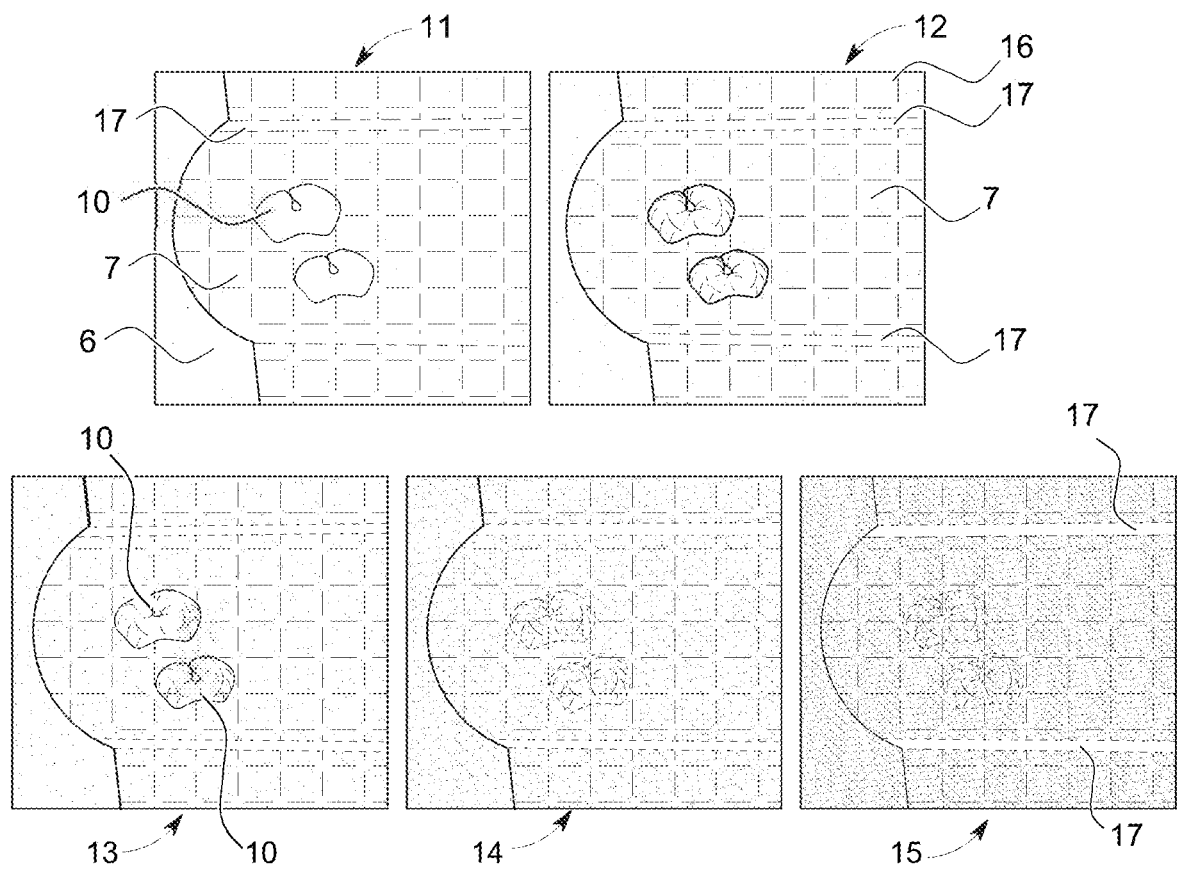
FIG. 2 is a schematic illustration of raw overview images according to example embodiments of the invention.

FIG. 2 illustrates schematically different raw overview images 11-15. The latter respectively show the same sample environment and are captured with different capture parameters. Reference signs are not indicated in all of the raw overview images 11-15 for the sake of clarity, although the raw overview images 11-15 all correspond in terms of their fields of view and thus show the same scene. The raw overview images 11-15 differ by capture parameters, for example illumination intensity or exposure time, which is greatest in the raw overview image 11 and gradually decreases towards the raw overview image 15. Each raw overview image 11-15 shows, in one or more sample areas 10, microscopic samples which are located on a sample carrier 7 under a cover slip. Cover slip edges 17 appear bright in the raw overview images 11-15. An area outside the cover slip is designated as a background 16, wherein a holding frame 6 can optionally also be considered part of the background 16.

Depending on the sample type, samples are often best visible at a medium or high illumination intensity, as in the raw overview image 12 in the illustrated example. The sample area 10 is conversely oversaturated/overdriven in the particularly bright raw overview image 11, whereby details of the samples are lost. In the darker raw overview images 13-15, details are not identifiable in the sample areas 10 and it is more difficult to tell the samples apart from the sample carrier 7. The cover slip edges 17 typically appear much brighter in raw overview images than the sample areas 10 and are readily overdriven, which is the case in particular in the brighter raw overview images 11 and 12. The cover slip edges 17 are best visible in the illustrated example in the darkest raw overview image 15.

An assessment of the raw overview images 11-15 is described in the following with reference to the further figures.

FIG. 3

Figure 3:
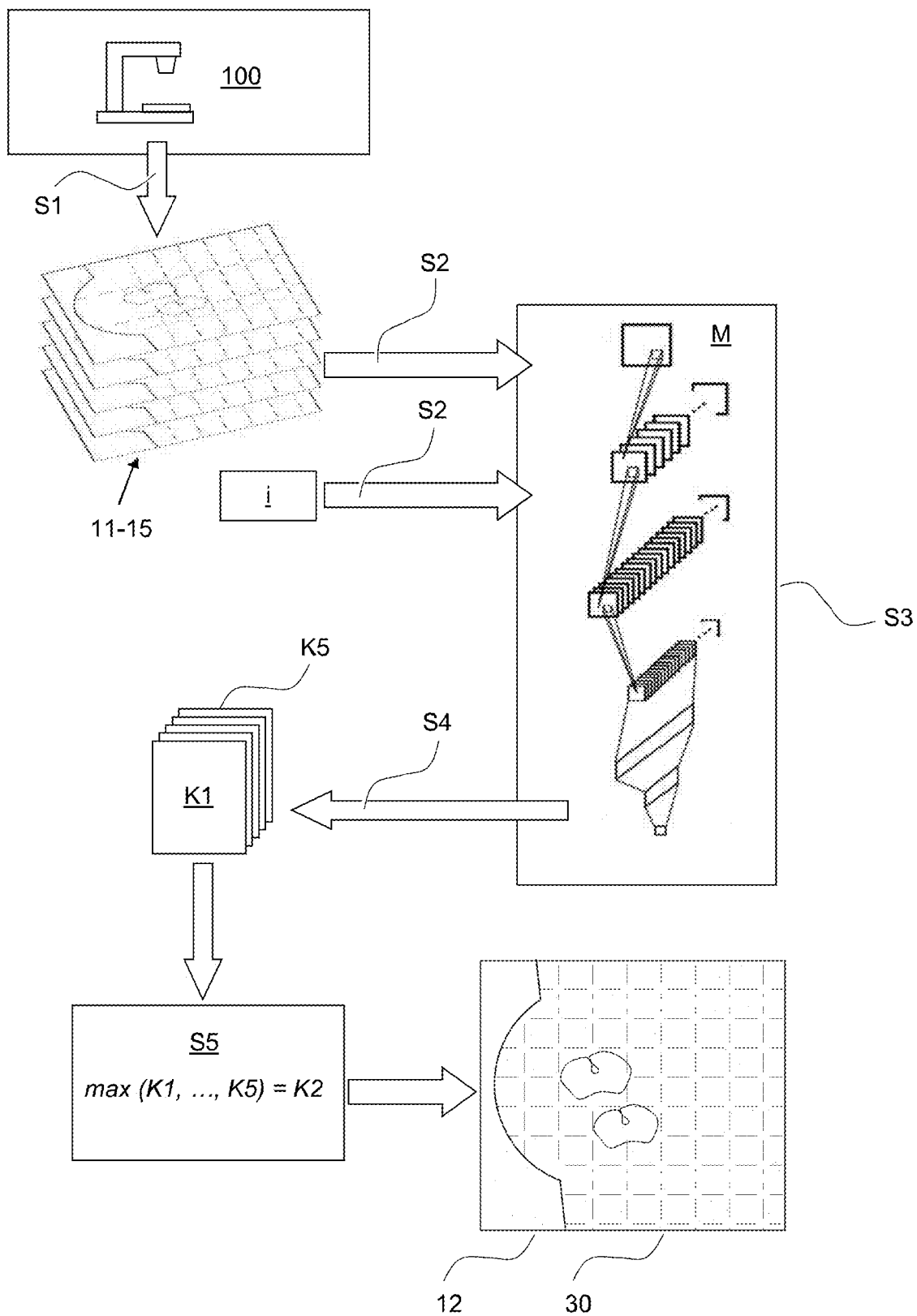
FIG. 3 is a schematic illustration of processes of an example embodiment of a method of the invention.

FIG. 3 shows schematically processes of an example method according to the invention for generating an overview image 30 based on a plurality of raw overview images 11-15.

First, in step S1, a plurality of raw overview images 11-15 are captured by the microscopy system 100 with different capture parameters. In step S2, the raw overview images 11-15 are input into a machine learning model M. The machine learning model M is trained to determine an overview image by calculating an assessment K1-K5 for each raw overview image 11-15 as step S3 and outputting the assessments K1-K5 in step S4.

The assessments K1-K5 determine how an overview image is generated from the raw overview images 11-15. To this end, the highest or best assessment from K1-K5 is determined in step S5 in the illustrated example, in this case K2, which belongs to the raw overview image 12. The raw overview image with the best assessment, i.e. the raw overview image 12, is selected as the overview image 30. The output of the machine learning model M thus defines a selection of one of the raw overview images 11-15 as the overview image 30.

The machine learning model M can optionally take into account contextual data i, which relates either to an individual raw overview image of the raw overview images 11-15 or to all raw overview images 11-15 alike. The contextual data i can relate, for example, to the capture parameters, a sample type or a sample carrier type.

Calculation steps of the machine learning model M are based on model parameter values, for example entries of convolutional matrices of a convolutional neural network of the machine learning model M. The model parameter values are defined using training data, as explained in greater detail in the following.

FIG. 4

Figure 4:
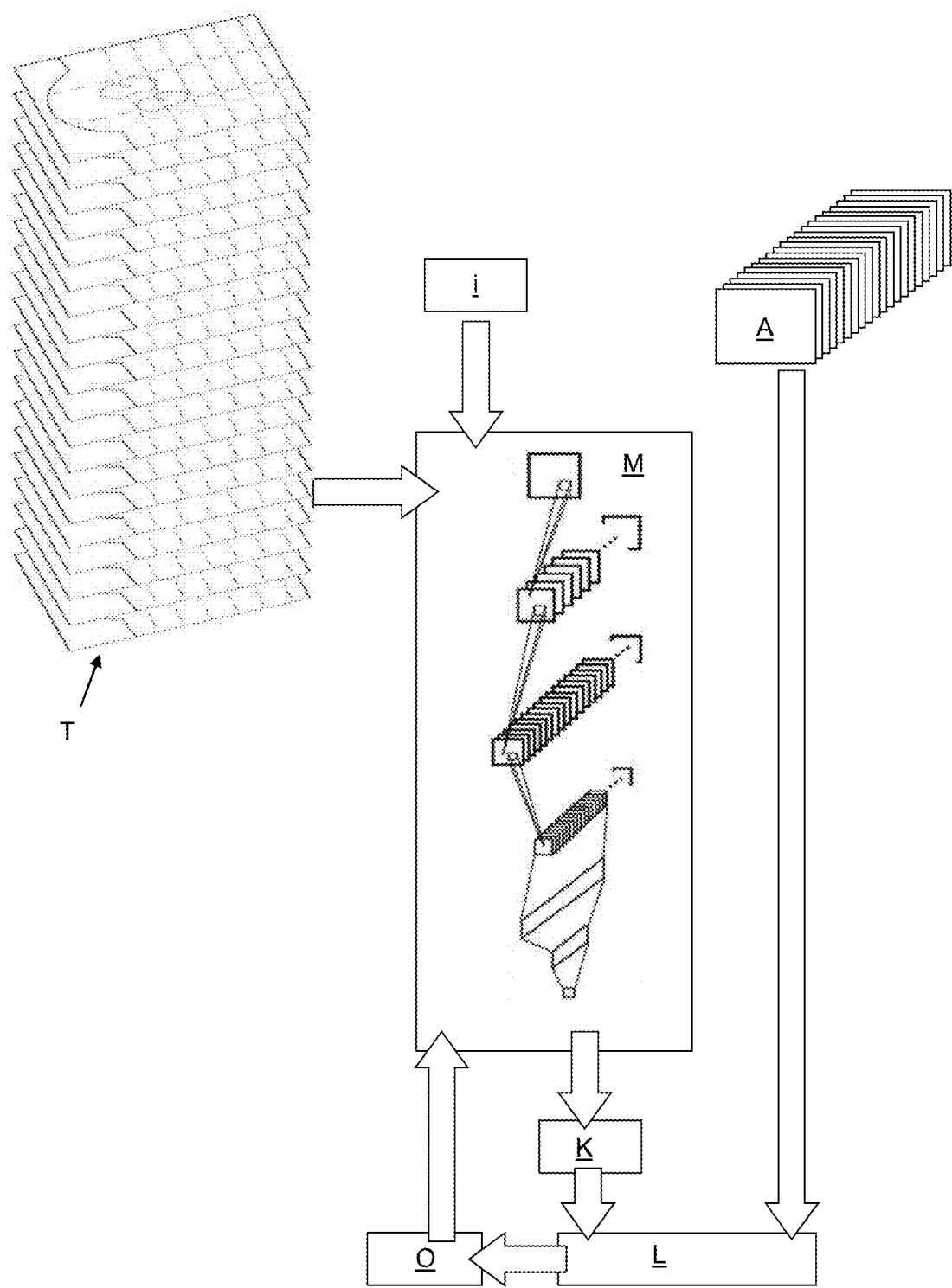
FIG. 4 is a schematic illustration of a training of a machine learning model of example embodiments of the invention.

FIG. 4 shows schematically a supervised training process of the machine learning model M. A plurality of training raw overview images T are provided, which can be identical to the described raw overview images. An annotation A is specified (manually) for each training raw overview image T, for example an assessment of the corresponding training raw overview image T by means of a score between 1 and 10. The machine learning model M calculates an output K from each of the input training raw overview images T based on current model parameter values. The outputs K and the corresponding annotations A are fed to an objective function, here a loss function L. The loss function L quantifies the extent to which the outputs K deviate from the annotations A. An optimization function O adapts the values of the model parameters of the machine learning model M using the loss function L, for example by means of backpropagation and gradient descent. Upon completion of the training, the machine learning model M generates outputs K which closely resemble the annotations A.

The annotations A can be chosen, for example, according to the assessment criterion of how high an image quality is in the sample area of the respective training raw overview images T, while an image quality outside the sample area is disregarded. In particular an overdrive, an underdrive, noise, a frequency distribution of brightness values and/or a contrast can serve as a measure of image quality. Using these annotations A, the machine learning model M also learns to assess or to process raw overview images in a manner that the output K is essentially calculated on the basis of the sample area, which in this case is identified discretely by the machine learning model M.

Optionally, in addition to the training raw overview images T, contextual data i can also be fed to the machine learning model M in the training, which can relate to, as already mentioned, the sample type, sample carrier type or capture parameters, inter alia. If the contextual data i forms part of the training data in this manner, then the machine learning model M learns to take contextual data i into account via its model parameters.

FIG. 5

Figure 5:
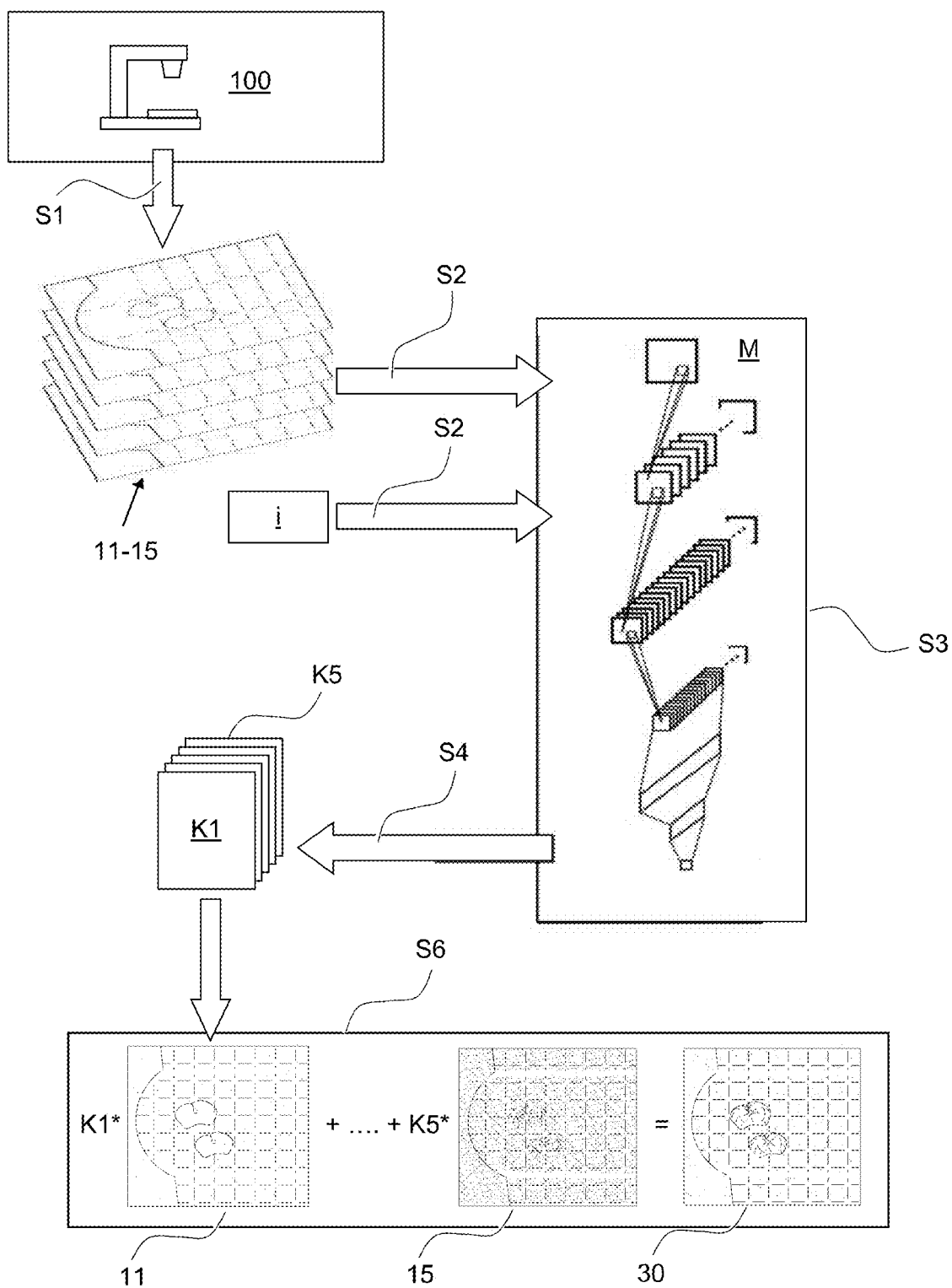
FIG. 5 is a schematic illustration of processes of a further example embodiment of a method of the invention.

FIG. 5 shows schematically processes of a further example method according to the invention for generating an overview image 30 based on a plurality of raw overview images 11-15.

This embodiment differs from the example of FIG. 3 by the manner in which output assessments K1 to K5 are used by the machine learning model M. In the example shown in FIG. 5, the raw overview image for which the highest assessment K1-K5 was determined is not selected as the overview image 30. Rather, in step S6, two or more of the raw overview images 11-15 are added together or superposed in order to form the overview image 30, wherein the assessments K1-K5 are used as weights. For example, the two raw overview images with the two best assessments can be added together, wherein their respective assessments constitute weights.

FIG. 6

Figure 6:
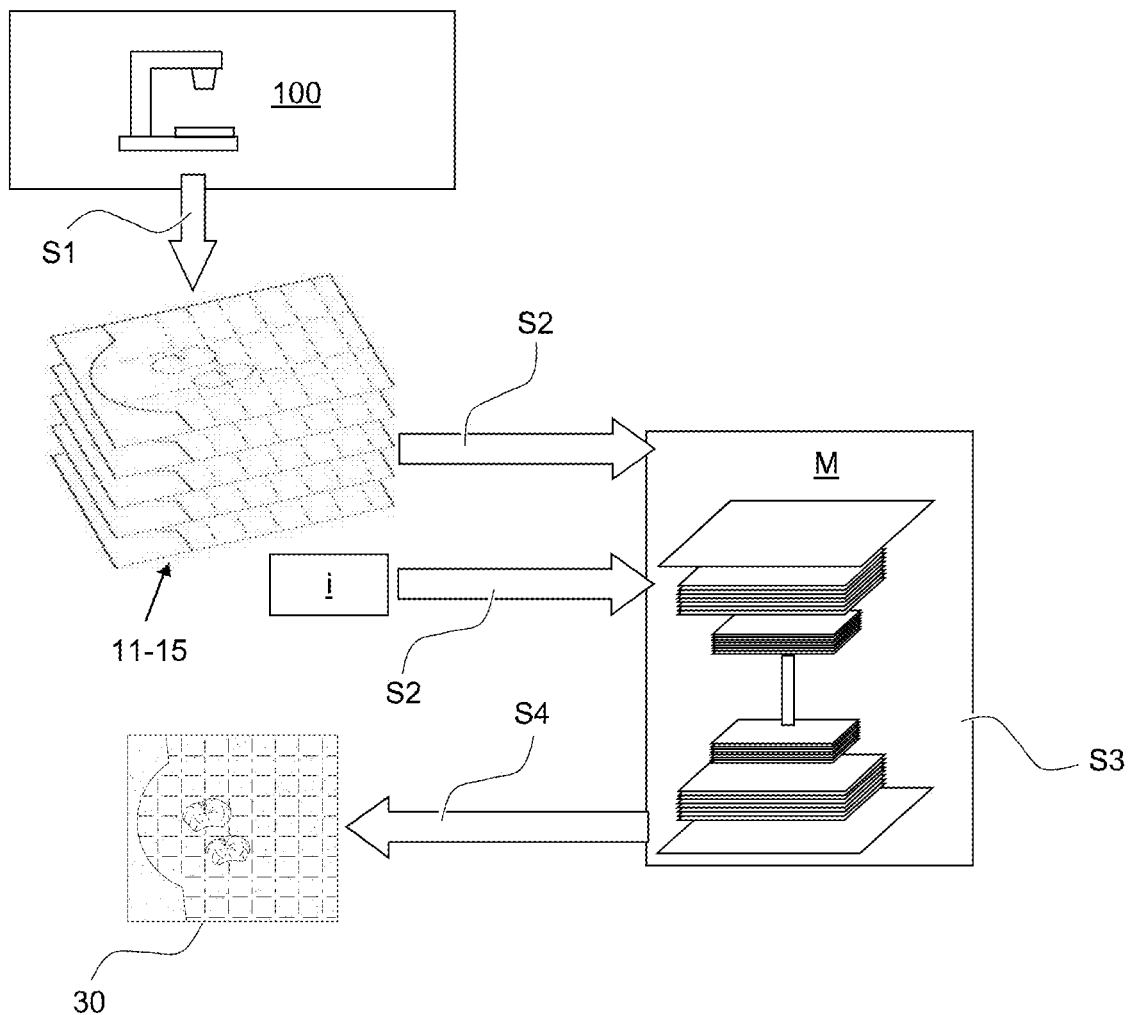
FIG. 6 is a schematic illustration of processes of a further example embodiment of a method of the invention.

FIG. 6 shows schematically processes of a further example method according to the invention for generating an overview image 30 based on a plurality of raw overview images 11-15. In this case, the raw overview images 11-15 are input collectively into the machine learning model M which, instead of outputting an assessment, outputs an overview image 30 directly. The overview image 30 can be, depending on the training of the machine learning model M, either a selection of one of the raw overview images 11-15, a linear combination of a plurality of the raw overview images 11-15 or a more complex combination calculated based on the raw overview images 11-15. An architecture of the machine learning model M can comprise, for example, one or more CNNs which generate a mapping of a plurality of input images onto one output image.

FIG. 7

Figure 7:
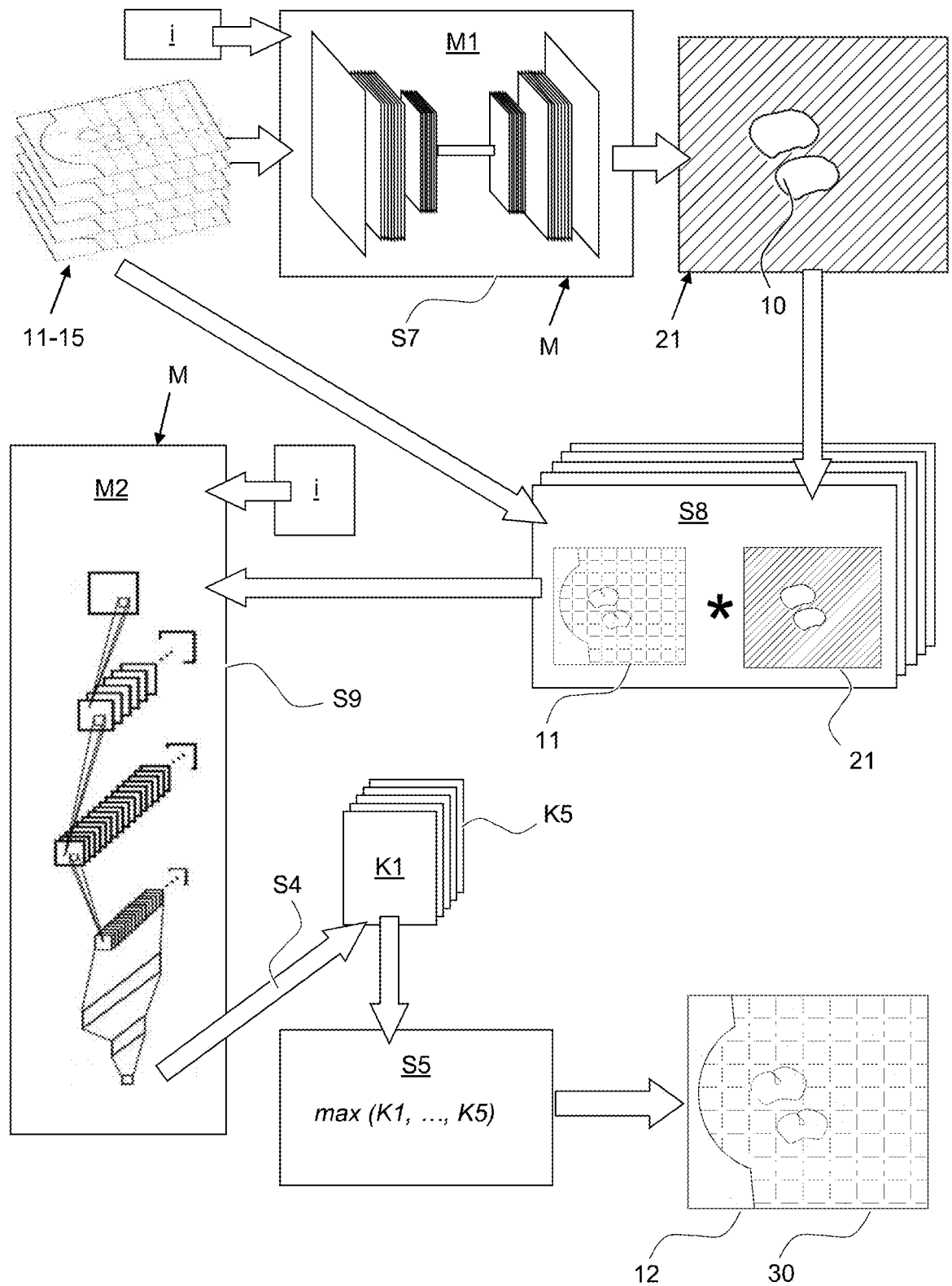
FIG. 7 is a schematic illustration of processes of a further example embodiment of a method of the invention.

FIG. 7 shows schematically processes of a further example method according to the invention for generating an overview image 30 based on a plurality of raw overview images 11-15.

In this example, the machine learning model M comprises two machine learning models M1 and M2. The machine learning model M1 is a segmentation model, which receives one or more of the raw overview images 11-15 in step S7 and calculates a segmentation mask 21 therefrom. The segmentation mask 21 labels sample areas 10 within one of the raw overview images 11-15. The machine learning model M1 can optionally exploit contextual data i.

The sample areas 10 of the raw overview images 11-15 are selected by means of the segmentation mask 21. This can occur, for example, in step S8 by means of a pixel-by-pixel multiplication of the segmentation mask 21 by each of the raw overview images 11-15, wherein all pixels outside sample areas 10 have a value of zero in the segmentation mask 21.

The thus processed raw overview images are fed to the machine learning model M2, which can be designed like the machine learning model M of FIG. 3 or FIG. 5. Unlike the cases shown in FIG. 3 or FIG. 5, however, the machine learning model M2 only receives image information from the sample areas 10 of the raw overview images 11-15. From this information, the machine learning model M2 calculates assessments K1-K5 in step S9, which are accordingly based solely on the respective sample areas 10. The assessments K1-K5 are output in step S4, upon which the step S5 described above can follow. In a variant, step S5 can be replaced by the step S6 described above.

FIG. 8

Figure 8:
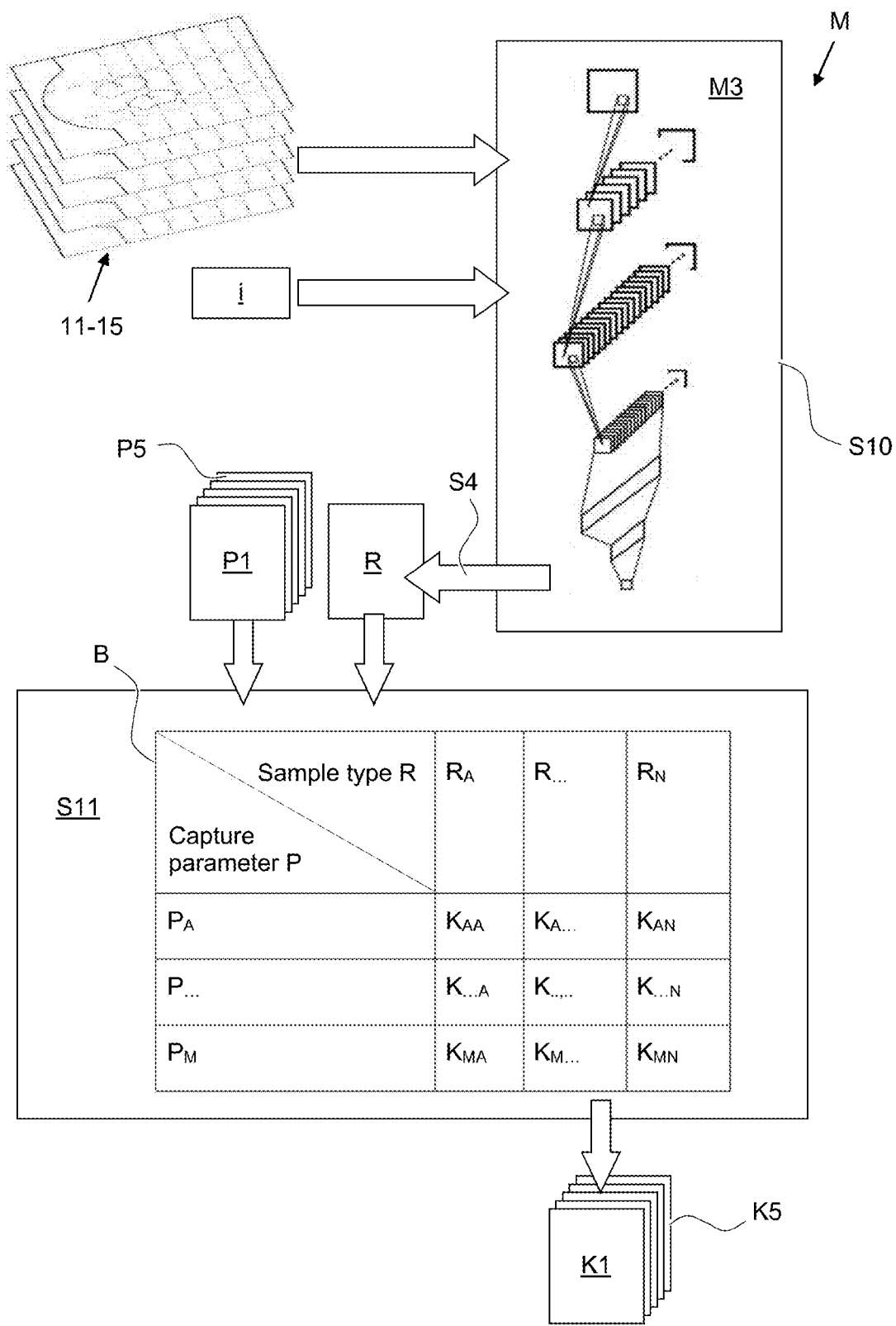
FIG. 8 is a schematic illustration of processes of a further example embodiment of a method of the invention.

FIG. 8 shows schematically processes of a further example method according to the invention for generating an overview image 30 based on a plurality of raw overview images 11-15.

One or more of the raw overview images 11-15 are fed to a machine learning model M3, which is a classification model trained to differentiate between different sample types, for example a dyed tissue section from an undyed tissue section. In step S10, the machine learning model M3 calculates a specification of the determined sample type R and outputs the same, step S4. The determined sample type R applies to all of the raw overview images 11-15.

The capture parameters P1-P5 with which the raw overview images 11-15 were captured are queried or estimated from the raw overview images 11-15.

An assessment table B in which assessments $K_{AA}$ to $K_{MN}$ are indicated for different sample types $R_A$ to $R_N$ and capture parameters $P_A$ to $P_M$ is now used in step S11. Respective assessments K1 to K5 are read out from the assessment table B for each of the raw overview images 11-15 based on the associated capture parameters P1-P5 and the determined sample type R. The steps S5 or S6 described above can then be carried out in order to provide the overview image.

The described example embodiments are purely illustrative and variants of the same are possible within the scope of the attached claims. In particular, image processing steps can be added before, between or after described steps. For example, raw overview images can be processed first, by a classic image processing algorithm or a further machine learning model such as a feature extractor, before being input into the described machine learning models.

LIST OF REFERENCES

1 Microscope
2 Stand
3 Objective revolver
4 Microscope objective
5 Sample stage
6 Holding frame
7 Sample carrier
8 Microscope camera
9 Overview camera
9A Field of view of the overview camera
9B Mirror
10 Sample area
11-15 Raw overview images
16 Background
17 Cover slip edge
20 Computing device
21 Segmentation mask
30 Overview image
80 Computer program
100 Microscopy system
A Annotation of training raw overview images
B Assessment table
i Contextual data
K, K1-K5 Assessments
$K_{AA}$-$K_{MM}$ Assessments
L Loss function
M, M1, M2 Machine learning model
M3 Machine learning model/classification model
O Optimization function
P1-P5 Capture parameters
$P_A$-$P_M$ Capture parameters
R Sample type
S1-S11 Steps of methods
T Training raw overview images

We claim:
1. A microscopy system comprising
a microscope which is configured to capture a raw overview image of a sample environment; and a computing device which is configured to control the microscope to capture a plurality of raw overview images showing the sample environment with different capture parameters, wherein the raw overview images differ in the capture parameters but do not differ in a sample state of the shown sample;

wherein the computing device comprises a machine learning model trained with training raw overview images which are annotated with regard to a suitability for use as an overview image, wherein annotations of the training raw overview images are assigned according to an image quality in a sample area or sample carrier area of the training raw overview images, while an image quality outside the sample area or sample carrier area is disregarded;

wherein the machine learning model receives the raw overview images as input and assesses, for each raw overview image, a respective suitability for use as an overview image, and wherein the machine learning model generates an output which is or which defines the overview image based on selecting at least one of the raw overview images which is determined to have a best suitability to be used as an overview image for its image quality in a sample area or sample carrier area, while an image quality outside the sample area or sample carrier area is disregarded.

2. The microscopy system according to claim 1,
wherein each of the training raw overview images is labelled with an annotation indicating an assessment of the corresponding training raw overview image, whereby the machine learning model is designed to generate an assessment as output for each of the input raw overview images.

3. The microscopy system according to claim 1,
wherein the machine learning model is designed to select one of the raw overview images as the overview image.

4. The microscopy system according to claim 1,
wherein the machine learning model is designed to generate the overview image by combining at least two of the raw overview images.

5. The microscopy system according to claim 1,
wherein the machine learning model is designed to identify sample areas in the raw overview images and to carry out an assessment of the respective sample areas in the raw overview images, wherein the computing device or the machine learning model is configured to make a selection, based on the assessments, which of the raw overview images is used as or for the overview image.

6. The microscopy system according to claim 5,
wherein the selection is based solely on the sample areas.

7. The microscopy system according to claim 1,
wherein the machine learning model is designed to perform a semantic segmentation in order to locate the sample areas in the raw overview images.

8. The microscopy system according to claim 1,
wherein the computing device is configured to determine the assessment of each sample area based on an assessment criterion relating to at least one of: an overdrive, an underdrive, noise, a frequency distribution of brightness values and a contrast.

9. The microscopy system according to claim 1,
wherein, when determining the overview image from the raw overview images, contextual data relating to one or more of the following characteristics is utilized:
a sample type or sample carrier type;
a type of an experiment to which the raw overview images belong;
capture parameters;
information from one or more of the other raw overview images;
classification results of entire image characteristics; and
information from other capture modalities.

10. The microscopy system according to claim 1,
wherein the machine learning model is designed to identify a sample type of a displayed sample from one or more of the raw overview images; and
wherein the machine learning model or the computing device is configured to select, depending on the identified sample type, which of the raw overview images is used as or for the overview image.

11. The microscopy system according to claim 10,
wherein the machine learning model comprises a trained classification model for identifying the sample type.

12. The microscopy system according to claim 1,
wherein the machine learning model is designed to determine a sample type for the input raw overview images;
wherein the computing device is configured to:
access a predetermined assessment table which contains assessments depending on at least one capture parameter and the sample type;
receive information regarding capture parameters of the raw overview images;
read out assessments of the raw overview images according to their capture parameters and the determined sample type from the assessment table; and
select, based on the read-out assessments, which of the raw overview images is used as or for the overview image.

13. A method for generating an overview image, comprising
capturing raw overview images of a sample environment with different capture parameters by means of an overview camera of a microscope, wherein the raw overview images differ in the capture parameters but do not differ in a sample state of the shown sample;
inputting the raw overview images into a machine learning model trained with training raw overview images which are annotated with regard to a suitability for use as an overview image, wherein annotations of the training raw overview images are assigned according to an image quality in a sample area or sample carrier area of the training raw overview images, while an image quality outside the sample area or sample carrier area is disregarded;
wherein the machine learning model assesses, for each raw overview image, a respective suitability for use as an overview image, and wherein the machine learning model generates an output which is or which defines the overview image based on selecting at least one of the raw overview images which is determined to have a best suitability to be used as an overview image for its image quality in a sample area or sample carrier area, while an image quality outside the sample area or sample carrier area is disregarded.

14. A computer program stored on a non-transitory computer-readable medium, the computer program including commands that, when executed by a computer, cause the execution of the method according to claim 13.

15. A microscopy system comprising
a microscope which is configured to capture a raw overview image of a sample environment; and a computing device which is configured to control the microscope to capture a plurality of raw overview images showing the sample environment with different capture parameters;

wherein the computing device comprises a machine learning model trained with training raw overview images, wherein the machine learning model is configured to determine a sample type for the input raw overview images; and wherein the computing device is configured to:
- access a predetermined assessment table which contains scores depending on the sample type and microscope settings;
- receive information on the microscope settings used for capturing the raw overview images;
- use the assessment table to assign scores to the raw overview images according to the microscope settings used for capturing the raw overview images and according to the determined sample type; and
- determine which raw overview image of the raw overview images has a highest score due to the microscope settings and the sample type, and select at least the raw overview image with the highest score to be used as or for an overview image.

16. The microscopy system according to claim 15, wherein a plurality of raw overview images with highest scores are selected and combined to form the overview image, wherein the scores serve as weights in combining the raw overview images to form the overview image.

* * * * *